(12) United States Patent
Chen et al.

(10) Patent No.: US 12,409,392 B2
(45) Date of Patent: Sep. 9, 2025

(54) METHOD AND DEVICE FOR CONTROLLING LINEAR BRAKES OF REMOTE-CONTROLLED MODEL RACING CARS

(71) Applicant: SHENZHEN HOBBYWING TECHNOLOGY CO., LTD., Guangdong (CN)

(72) Inventors: Dewei Chen, Guangdong (CN); Youhui Liu, Guangdong (CN); Diyu Li, Guangdong (CN)

(73) Assignee: SHENZHEN HOBBYWING TECHNOLOGY CO., LTD., Shenzhen (CN)

( * ) Notice: Subject to any disclaimer, the term of this patent is extended or adjusted under 35 U.S.C. 154(b) by 279 days.

(21) Appl. No.: 18/114,128

(22) Filed: Feb. 24, 2023

(65) Prior Publication Data
US 2024/0058716 A1    Feb. 22, 2024

(30) Foreign Application Priority Data
Aug. 22, 2022    (CN) .......................... 202211003903.6

(51) Int. Cl.
*H02P 21/00*    (2016.01)
*A63H 17/42*    (2006.01)
*A63H 29/00*    (2006.01)
*A63H 30/04*    (2006.01)

(52) U.S. Cl.
CPC ............. *A63H 30/04* (2013.01); *A63H 17/42* (2013.01)

(58) Field of Classification Search
CPC .. H02P 21/00; H02P 21/0003; H02P 21/0021; H02P 21/0085; H02P 21/22; H02P 21/24; H02P 21/36; H02P 25/03; B60L 7/08; B60L 7/18; A63H 30/04; A63H 17/42
See application file for complete search history.

(56) References Cited

U.S. PATENT DOCUMENTS

| | | | |
|---|---|---|---|
| 2015/0171674 A1* | 6/2015 | Lee ....................... | H02K 29/00 310/46 |
| 2017/0129340 A1* | 5/2017 | Murthy .................. | H02P 21/22 |

FOREIGN PATENT DOCUMENTS

| | | | |
|---|---|---|---|
| AT | 522280 A1 * | 10/2020 | |
| CN | 113193795 A * | 7/2021 | ............. H02P 6/085 |
| JP | 2006068232 A * | 3/2006 | |

(Continued)

*Primary Examiner* — Steven J Hylinski

(57) ABSTRACT

The disclosure discloses a method and device for controlling linear brakes of remote control model racing cars; the user sends a remote-control command to a motor control module of the model car through a remote controller; the remote-control command includes a braking command; the braking command includes the current throttle value; when remote-control command a braking command is sent, the motor control module selects the appropriate braking algorithm according to the current brushless motor speed; if the current brushless motor speed is greater than the first threshold, the field-oriented control (Foc) brake control algorithm is selected according to the received remote-control command and controls the braking current of the brushless motor; if the current brushless motor speed is less than or equal to the first threshold, the braking algorithm is switched based on pulse width modulation (PWM) control.

10 Claims, 6 Drawing Sheets

Block diagram of square wave driving algorithm

Overall control block diagram

(56) References Cited

FOREIGN PATENT DOCUMENTS

| JP | 2008137550 A | 6/2008 | | |
| WO | WO-2004052485 A2 * | 6/2004 | ............ | A63H 17/36 |

* cited by examiner

The user sends the remote-control command to the motor control module of the model car through a remote controller; the remote-control command includes a braking command; the braking command includes the current throttle value;

When the remote-control command is a braking command, the motor control module selects appropriate braking algorithm according to the current brushless motor speed; if the current brushless motor speed is greater than the first threshold, the Foc brake control algorithm is selected according to the received remote-control command and controls the braking current of the brushless motor; if the current speed of the brushless motor is less than the first threshold, the braking algorithm is switched based on PWM control according to the received remote-control command and controls the braking current of the brushless motor.

The brushless motor controls the braking torque of the braking transmission system according to the braking current.

FIG. 1

METHOD AND DEVICE FOR CONTROLLING LINEAR BRAKES OF REMOTE-CONTROLLED MODEL RACING CARS

CROSS-REFERENCE TO RELATED APPLICATION

This application claims priority from the Chinese patent application 202211003903.6 filed Aug. 22, 2022, the content of which is incorporated herein in the entirety by reference.

TECHNICAL FIELD

The disclosure pertains to the field of remote-controlled model racing cars, in particular to a method and a device for controlling the linear brakes of remote-controlled model racing cars.

BACKGROUND

The field of remote-controlled model racing cars is demanding on the control performance of model cars, as it is crucial to the results of any competition. At present, a vast majority of remote-controlled model racing cars available in the market are powered by brushless motors, and their motors are controlled using a square wave drive (six-step commutation). This achieves the manipulation of the remote-control model car. The disclosure only aims at the working conditions of the brakes and this topic is elaborated on here. Under the square wave drive, the three-phase lower bridge is generally subject to the concurrent PWM modulation to form a circuit; the BEMF is used to generate braking current for braking effect (hereinafter referred to as conventional braking). The driver may adjust the magnitude of the equivalent BEMF by controlling the duty cycle of a three-phase lower bridge PWM through the remote-controller. Doing so controls the magnitude of braking current. As the magnitude of the BEMF is also related to the motor speed, the magnitude of the braking current is jointly determined by the duty cycle of the three-phase lower tube PWM control and the motor speed. This does not allow the driver to accurately control the braking force, thus seriously affecting the maneuverability of model cars under braking conditions.

Moreover, the prior art does not enable the linear control of remote-controlled model racing cars through remote-controls. As a result, this causes the drivers (model car operators) to fail to control the speed of remote-controlled cars under braking conditions, which affects the maneuverability of model cars when braking.

SUMMARY

In view of this, the embodiment of the disclosure aims to switch the driving mode from a square wave drive to a magnetic Foc drive when the remote-controller issues a braking command. The braking current is directly controlled using the Foc algorithm. Since the current is proportional to the torque, the indirect control of the brake torque is realized, so that the magnitude of the braking force is only related to the braking command issued by the remote-controller. This avoids the influence of speed on braking force as occurs under a conventional braking algorithm, and greatly improves the maneuverability of the car under braking conditions.

The first aspect of the disclosure provides a method for controlling the linear brakes of remote-controlled model racing cars comprising that:

S1. The user sends the remote-control command to the motor control module of the model car through a remote-controller; the remote-control command includes a braking command; a braking command includes the current throttle value;

S2. When a braking command is sent by the remote-controller, the motor control module selects appropriate braking algorithm according to the speed of the current brushless motor; if the speed of the current brushless motor is greater than the first threshold, the Foc brake control algorithm selects the braking reaction according to the received remote-control command and controls the braking current of the brushless motor; if the current speed of the brushless motor is less than the first threshold, the braking algorithm is switched based on PWM control according to the received remote-control command and the braking current of the brushless motor is controlled.

S3. The brushless motor controls the braking torque of the braking transmission system according to the braking current.

Furthermore, in the S2, if the speed of the current brushless motor is greater than the first threshold, the magnetic Foc brake control algorithm is selected according to the received remote-control command and controls the braking current of the brushless motor. It is comprised of following steps:

S201. Convert the current throttle value in the braking command into the reference braking current Iq, and input it to the current controller;

S202. The current controller may determine the voltage required to maintain the reference braking current, and output voltages Vd and Vq;

S203. Based on the rotor angle information provided by the HALL sensor, derive Valpha and Vbeta in the stator coordinate system from inverse PARK transformation of the voltages Vd and Vq;

S204. Generate the control signal of the inverter and realize the control of brushless motors after Valpha and Vbeta are input to SVPWM.

Furthermore, in the S2, if the speed of the current brushless motor is less than or equal to the first threshold, the braking current of the brushless motor is controlled by switching to a braking algorithm based on the PWM control according to the received remote-control command, including:

S211. Convert the current throttle value in the braking command into the duty cycle signal of the three lower bridges and input it to the inverter;

S212. When the motor has a rotating speed, the permanent magnet of the motor will cut the wire and generate a BEMF in the three phase lines. At this time, the three lower bridges will be connected to form a loop, and the BEMF will generate the braking current in the loop to achieve the braking effect.

Furthermore, in S1, the remote-control command also includes a driving command; the driving command includes the current throttle value;

The S2 also includes steps of the motor control module controlling the output voltage of the inverter and the driving speed of the motor by adjusting the duty cycle of the PWM module according to the current throttle value when the remote-control command is a driving command.

In addition, the second aspect of the disclosure also discloses a device for controlling the linear brakes of remote-controlled model racing cars. The device consists of a remote-control, a motor control module, a brushless motor, and a transmission system;

The remote-controller may receive the remote-control command selected by the user according to the condition of the model cars, and send the remote-control command to the motor control module of the model cars; the remote-control command includes a braking command; the braking command includes the current throttle value;

The motor control module may control the motor by receiving a remote-controlled command and selecting appropriate control algorithms; when a braking command is sent by the remote-controller, the appropriate braking algorithm is selected according to the speed of the current brushless motor; if the speed of the current brushless motor is greater than the first threshold, the braking current of the brushless motor is controlled by selecting the Foc brake control algorithm according to the received remote-controlled command; if the speed of the current brushless motor is less than or equal to the first threshold, the braking current of the brushless motor is controlled by switching to the braking algorithm based on the PWM control according to the received remote-control command;

The transmission system may receive and control the braking torque of the brushless motor on the transmission system according to the braking current.

Furthermore, the motor control module also includes a first brake control module. The first brake control module may select the Foc brake control algorithm according to the received remote-control command and the braking current of the brushless motor is controlled if the speed of the current brushless motor is greater than the first threshold; the first brake control module is also used under following conditions:

The current throttle value in the braking command is converted into the reference braking current Iq and input into the current controller; the current controller determines the voltage required to maintain the reference value of the braking current, and outputs the voltages Vd and Vq; based on the rotor angle information provided by the HALL sensor, the Valpha and Vbeta in the stator coordinate system are derived from inverse PARK transformation of the voltages Vd and Vq; Valpha and Vbeta are input to the SVPWM to generate the control signal of the inverter and to control the brushless motor.

Furthermore, the motor control module also includes a second brake control module. The second brake control module may control the braking current of the brushless motor when the speed of the current brushless motor is less than or equal to the first threshold value by switching to the brake algorithm based on PWM control according to the received remote-control command;

The second brake control module is also used under following conditions: The current throttle value in the braking command is converted into the duty cycle signal of the three lower bridges and input it to the inverter; when the motor has a rotating speed, the permanent magnet of the motor will cut the wire and generate a BEMF in the three phase lines. At this time, the three lower bridges will be connected to form a loop, and the BEMF will generate the braking current in the loop to achieve the braking effect.

In addition, the third aspect of the disclosure provides a linear brake control system which includes the aforesaid device for controlling the linear brakes of remote-controlled model racing cars, and the steps for implementing the aforesaid method for controlling the linear brakes of remote-controlled model racing cars.

In addition, the fourth aspect of the present disclosure provides a computer-readable storage medium in which at least one instruction is stored; such instruction is loaded and executed by a processor to realize the steps of the aforesaid method for controlling the linear brakes of remote-controlled model racing cars.

According to some embodiments of the present disclosure, the user sends a remote-control command to a motor control module of the model car through a remote-controller; the remote-control command includes a braking command; the braking command includes the current throttle value; when a braking command is sent by the remote-controller, the motor control module selects the appropriate braking algorithm according to the speed of the current brushless motor; if the speed of the current brushless motor is greater than the first threshold, the Foc brake control algorithm is selected according to the received remote-control command and the braking current of the brushless motor is controlled; if the speed of the current brushless motor is less than or equal to the first threshold, the braking algorithm is switched based on the PWM control according to the received remote-control command and the braking current of the brushless motor is controlled; the brushless motor controls the braking torque of the braking transmission system according to the braking current. When a braking command is issued through the remote-controller, the drive mode is switched from square wave drive to magnetic FOC drive, and the FOC control algorithm is used to directly control the braking current. Since the current is proportional to the torque, the indirect control of the brake torque is realized, so that the brake force is only related to the braking command issued by the driver's remote-controller. Doing so avoids the impact of speed on the brake force under the conventional brake algorithm, and greatly improves the maneuverability of the car under braking conditions.

BRIEF DESCRIPTION OF DRAWINGS

In order to more explicitly explain the technical solution of the embodiments of the disclosure, the accompanied drawings required in the embodiments will be briefly described. It should be understood that the following drawings only show some embodiments of the disclosure, and shall not be construed as restrictions to the scope. It is apparent to those ordinary skills in the art that, they may derive other relevant drawings based on these drawings without creative efforts.

FIG. 1 is a flow diagram of the method for controlling the linear brakes of remote-controlled model racing cars disclosed in the embodiment 1 of the present disclosure;

DETAILED DESCRIPTION OF THE PRESENT DISCLOSURE

Figure 2:
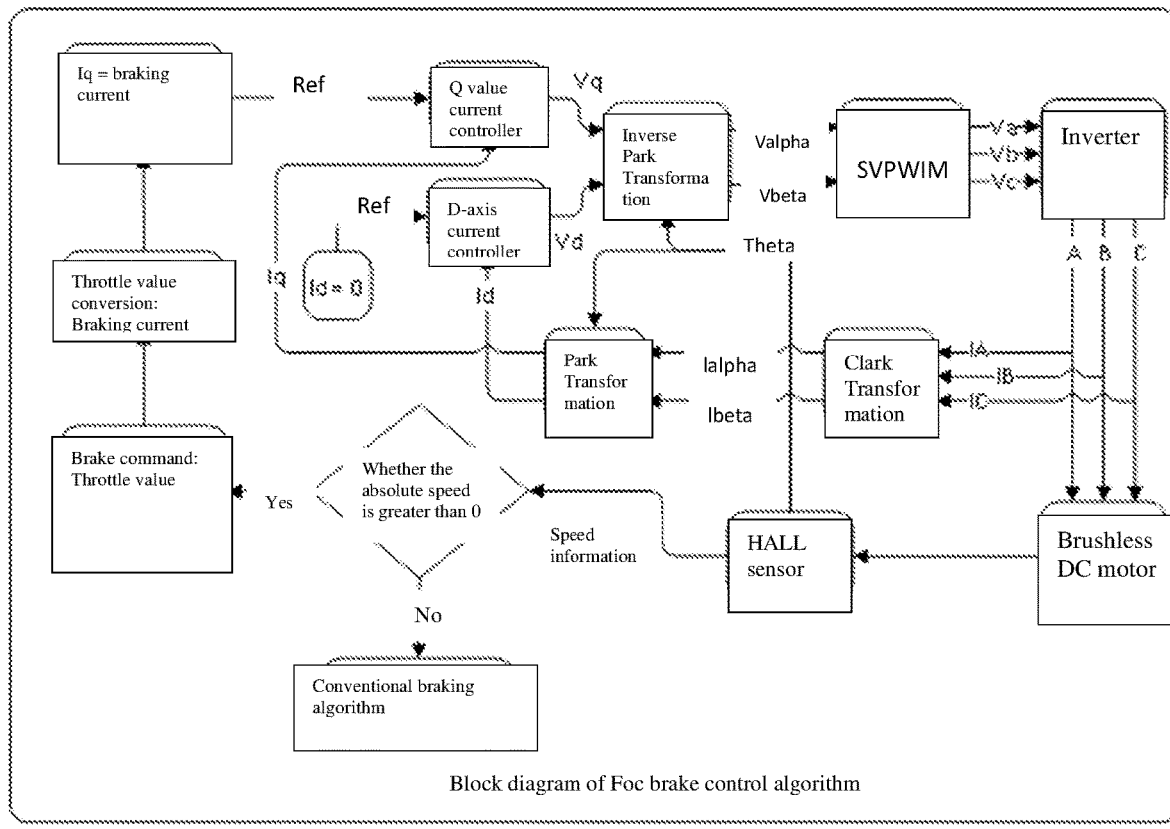
FIG. 2 is the overall block diagram of the Foc brake control algorithm disclosed in embodiment 1 of the present disclosure.

The exemplary embodiments will now be elaborated on in more detail with reference to the accompanying drawings. However, the exemplary embodiments may be implemented in a variety of forms, and shall not be construed as a restriction to the embodiments set forth herein; on the contrary, such embodiments ensure a more comprehensive and complete application and thoroughly convey the ideas of the exemplary embodiments to those skilled in the art.

Furthermore, the described characteristics, structures or features may be combined in one or more embodiments in any suitable manner. Many specific details are provided below to offer a full knowledge of the embodiments of the present application. However, those skilled in the art will realize that the technical solution of the application may be practiced without one or more specific details, or other methods, components, devices, steps, etc. may be employed. In other cases, well-known methods, apparatuses, implementations or operations are not shown or described in detail to avoid blurring aspects of the present application.

The block diagram in the drawings only illustrates a functional entity and does not necessarily correspond to a physically independent entity. Namely, such functional entities may be implemented in software, or in one or more hardware modules or integrated circuits, or in different networks and/or processor devices and/or microcontroller devices.

The flow chart shown in the drawings is only an exemplary description, and does not necessarily include all contents and operations/steps, nor shall it be executed in the described order. For instance, some operations/steps may be decomposed, while some operations/steps may be entirely or partially combined. Accordingly, the actual execution order may change depending on the actual situation.

It shall be noted that: The "multiple" mentioned herein refers to two or more.

The implementation details of the technical solution of the embodiment of the application are elaborated below:

Please refer to FIG. 1, a flow diagram of a method for controlling the linear brakes of remote-controlled model racing cars as disclosed in the embodiment of the disclosure. As shown in FIG. 1, a method for controlling the linear brakes of remote-controlled model racing cars is disclosed in the comprised embodiment of the disclosure:

S1. The user sends a remote-control command to the motor control module of the model car through a remote-controller; the remote-control command includes a braking command; the braking command includes the current throttle value.

Specifically in this embodiment, the driver selects different remote-control commands to control the model car depending on the vehicle conditions. When the driver wants the car to enter the driving state, the driver sends the driving command (including the throttle size) through the remote-controller. The motor control module may adjust the duty cycle of the PWM module according to the throttle size and control the output voltage of the inverter, so as to achieve the effect of controlling the rotation speed of motors. When braking is required, the driver sends a braking command (including the current throttle value) through the remote-controller. The braking command includes the current throttle value; at this time, the control algorithm is switched to the Foc control module which is used to precisely control the braking current of the brushless motor, thus realizing the linear braking control of the remote-controlled cars.

S2. When a braking command is sent by the remote-controller, the motor control module selects an appropriate braking algorithm according to the speed of the current brushless motor; if the speed of the current brushless motor is greater than the first threshold, the Foc brake control algorithm is selected according to the received remote-control command and controls the braking current of the brushless motor; if the current speed of the brushless motor is less than the first threshold, switch to the braking algorithm based on PWM control according to the received remote-control command and controls the braking current of the brushless motor.

S3. The brushless motor controls the braking torque of the braking transmission system according to the braking current.

Further in S2, if the speed of the current brushless motor is greater than the first threshold, the braking current of the brushless motor is controlled by selecting the Foc brake control algorithm according to the received remote-control command to control braking. It includes following steps. In S201, the current throttle value is converted in the braking command into the reference braking current Iq, and input it to the current controller; in S202, the current controller determines the voltage required to maintain the reference braking current, and to output voltages Vd and Vq; in S203, based on the rotor angle information provided by the HALL sensor, the Valpha and Vbeta in the stator coordinate system are derived from the inverse PARK transformation of voltages Vd and Vq; in S204, Valpha and Vbeta are input into SVPWM and generate the control signal of inverter to realize the control of brushless motor.

Specifically in this embodiment, the speed information of the brushless DC motor is generally sensed using the HALL sensor. Because the HALL sensor has low accuracy, and excessively low motor speeds may affect the motor control accuracy of the Foc algorithm, it is possible to set s to a small value of the first threshold, such as a speed close to 0. Doing so may control the braking current of the brushless motor according to the received remote-control command if the speed of the current brushless motor is greater than the first threshold during the brake control; if the speed of the current brushless motor is less than or equal to the first threshold, the braking algorithm based on the PWM control is switched and the braking current of the brushless motor is controlled according to the received remote-control command.

Furthermore, FIG. 2 shows an overall block diagram of the Foc brake control algorithm in this embodiment. First, the three-phase current signals, IA, IB, and IC, are collected through the current sensor; the Ialpha and Ibeta currents in the stator coordinate system are derived from the Clark transformation of the three-phase current signal; the Id and Iq currents are derived from the Park transformation of the Ialpha and Ibeta currents using the rotor angle information provided by the HALL sensor. The Id current is the direct axis current without torque, so the D axis current controller is used here to control the Id current to 0A to reduce unnecessary energy loss caused by stator heating. The current Iq is the torque current (generating torque), which is proportional to the motor torque. The motor torque may be accurately controlled by controlling the magnitude of the current Iq. Based on the previously obtained correlation coefficient, the throttle value in the remote-control command is converted into the reference current Iq, and the Iq current is controlled to the Iq reference current value using the Q-axis current controller. This allows the indirect control of the throttle over the motor torque. The linear control of the motor brake is realized.

It should be noted that in this embodiment, when the Foc braking algorithm is executed, the throttle value is converted into the reference braking current Iq and input into the current controller. The current controller may calculate the voltage required to maintain the reference current. The Valpha and Vbeta in the stator coordinate system are derived from the inverse PARK transformation of Vd and Vq, outputs of the two current controllers using the rotor angle information provided by the HALL sensor. Then Valpha and Vbeta enter the SVPWM (space vector modulation technology) module and generate the control signal of the inverter to achieve the control of the motor.

Furthermore, in S2, if the speed of the current brushless motor is less than or equal to the first threshold, the braking current of the brushless motor is controlled by switching to a braking algorithm based on the PWM control according to the received remote-control command, including: S211. The current throttle value in the braking command is converted into the duty cycle signal of the three lower bridges and this is input into the inverter; S212. When the motor has a rotating speed, the permanent magnet of the motor will cut the wire and generate the BEMF in the three phase lines. At this time, the three lower bridges will be connected to form a loop, and the BEMF will generate the braking current in the loop to achieve the braking effect.

Figure 3:
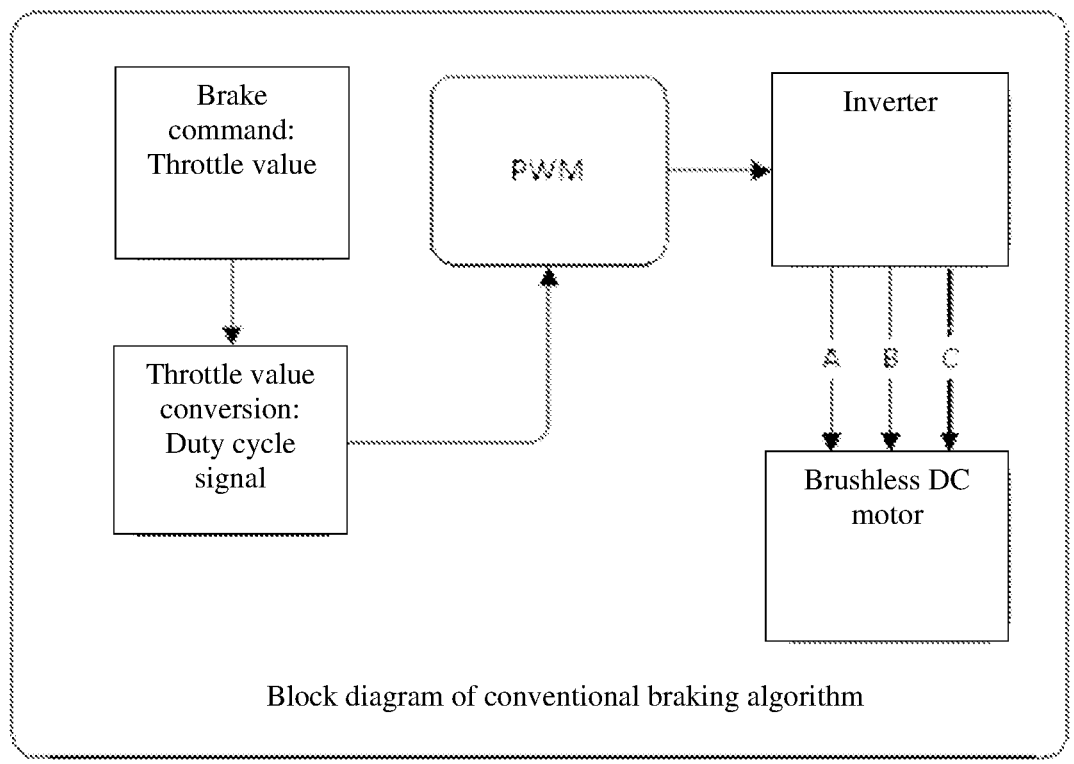
FIG. 3 is a conventional braking algorithm framework disclosed in the embodiment 1 of the present disclosure.

Specifically in this embodiment, the HALL sensor has low accuracy. An excessively slow motor speed may affect the motor control accuracy of the Foc algorithm. When the speed of the brushless motor is too low, it should switch back to the conventional braking algorithm. If the speed of the current brushless motor is less than or equal to the first threshold, it is possible to set s to a small value of the first threshold, such as a speed close to 0. Namely, when the brushless motor speed is low and is close to stopped, the braking current of the brushless motor will be controlled by switching to the brake algorithm based on PWM control (i.e. conventional brake algorithm) according to the received remote-control command. Specifically, FIG. 3 is the block diagram of the conventional braking algorithm in this embodiment. The throttle value signal of the braking command is converted into the duty cycle signal of the three-way lower bridge and input to the inverter. When the motor has a rotating speed, the motor permanent magnet will cut the wire and generate a BEMF in the three-way phase line. At this time, if the three-way lower bridge is connected to form a loop, the BEMF will generate braking current in the loop, thus achieving the braking effect. The duty cycle is used to control the conduction time of the lower bridges. When the reverse electric amplitude is the same (the speed is the same), the larger the duty cycle is, the longer the braking duration is, and the stronger the braking effect will be. Accordingly, brake control is achieved. Because the car is braked by the brake force generated by the BEMF using the algorithm, the BEMF will change as the speed varies. This will not cause a constant correspondence between the braking force and the throttle value, thus affecting the maneuverability of the brakes.

Furthermore, in the S1, the remote-control command also includes a driving command; the driving command includes the current throttle value; the S2 also includes steps of the motor control module controlling the output voltage of the inverter and the driving speed of the motor by adjusting the duty cycle of the PWM module according to the current throttle value when the remote-control command is a driving command.

Figure 4:
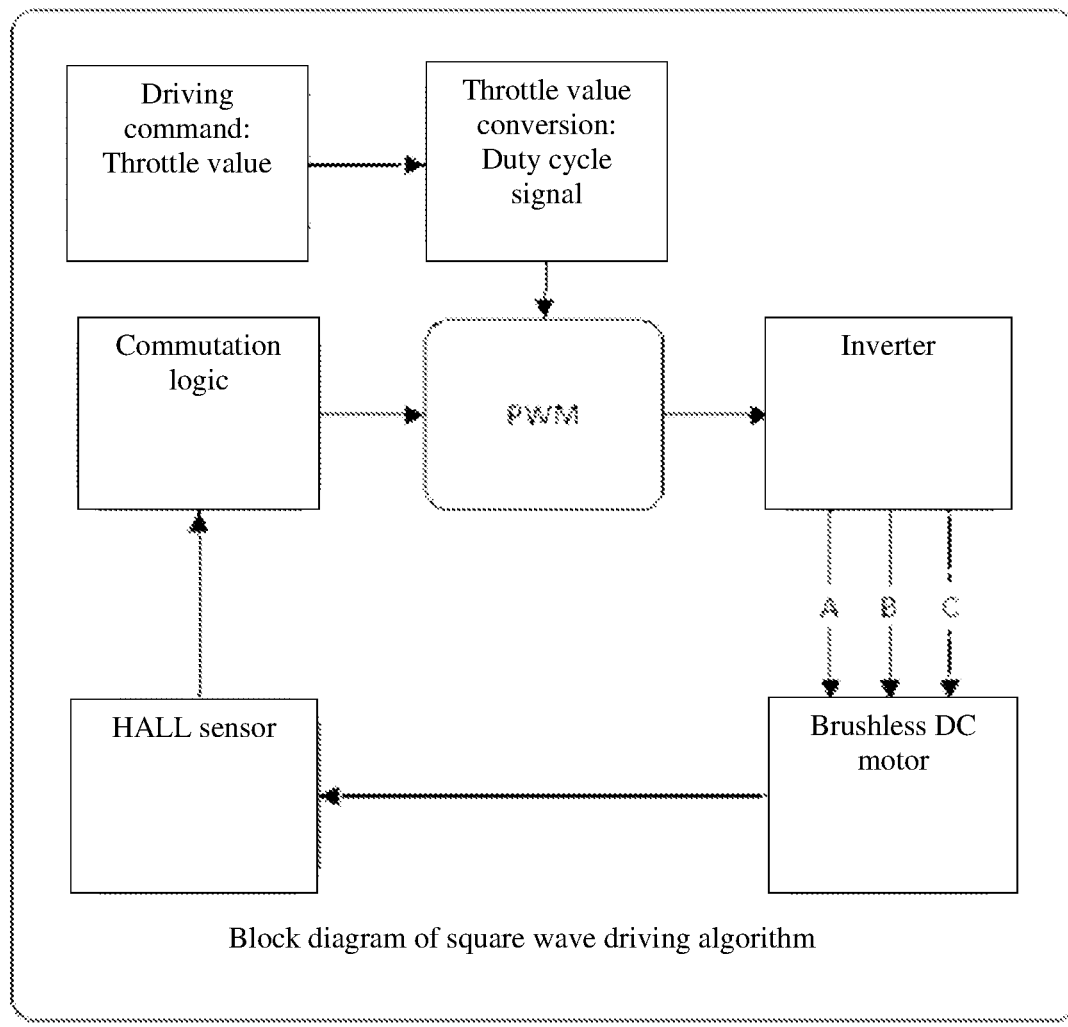
FIG. 4 is a basic block diagram of motor control using square wave drive algorithm in the driving state disclosed in the embodiment 1 of the disclosure.

Specifically, FIG. 4 of this embodiment is a basic block diagram that shows the control of motors in the driving state using the square wave drive algorithm. Wherein, the digital signal output by the HALL sensor is sent to the commutation logic module and appropriate tube-opening states are generated and converted into the duty cycle signal based on the throttle value. Such values may enter the inverter, and the motor is subject to six step commutation control in combination with PWM technology.

Figure 5:
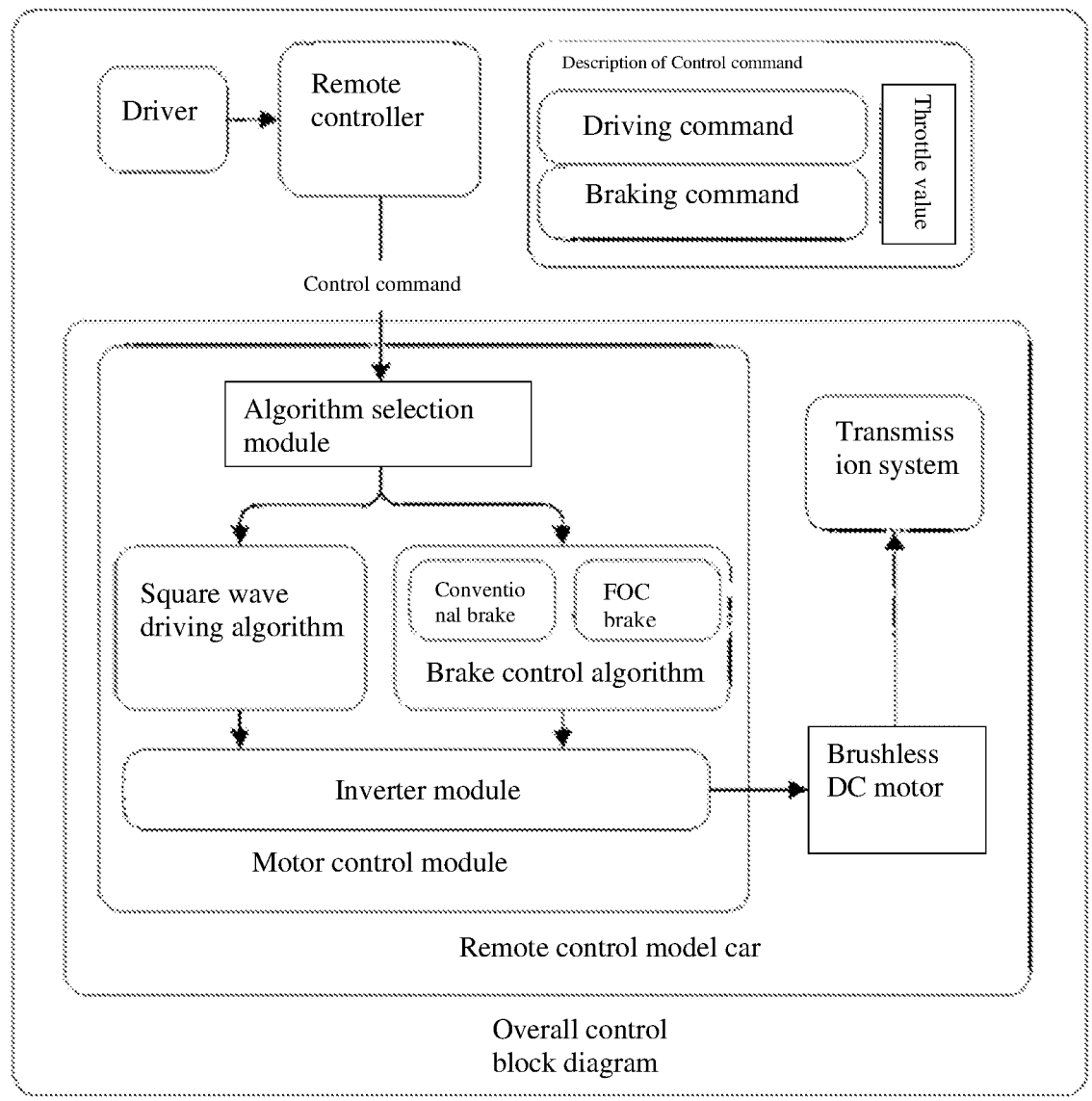
FIG. 5 is an overall control block diagram disclosed in the embodiment 1 of the present disclosure.

In summary, the overall control block diagram of this embodiment is shown in FIG. 5. The motor control module selects the appropriate control algorithm according to the control command given by the driver and controls the motor, so as to achieve the effect of controlling the remote-controlled model car. After receiving a braking command, the motor control module selects an appropriate braking algorithm according to the motor speed, among which, a square wave driving algorithm or braking control algorithm may be chosen. When the control command is the control command for normal driving, the square wave drive algorithm is started to perform speed control, and the control command is the braking command. Then the speed of the brushless motor is obtained, and the appropriate braking process is controlled by selecting and switching the brake algorithm according to the speed. When the motor speed is not 0, it will switch to the Foc braking algorithm to slow the motor through braking. When the speed is close to 0, it will switch back to the conventional braking algorithm (the low HALL sensor accuracy low, and the excessively low motor speed will affect the motor control accuracy of the Foc algorithm. At this time, it will switch back to the conventional braking algorithm). Since the current is proportional to the torque, indirect control of the braking torque is achieved. The magnitude of the braking force is only related to the braking command issued by the driver's remote-controller. This avoids the impact of rotating speed on the brake force under the conventional braking algorithm, and greatly improves the maneuverability of cars under braking conditions.

Embodiment 2

Figure 6:
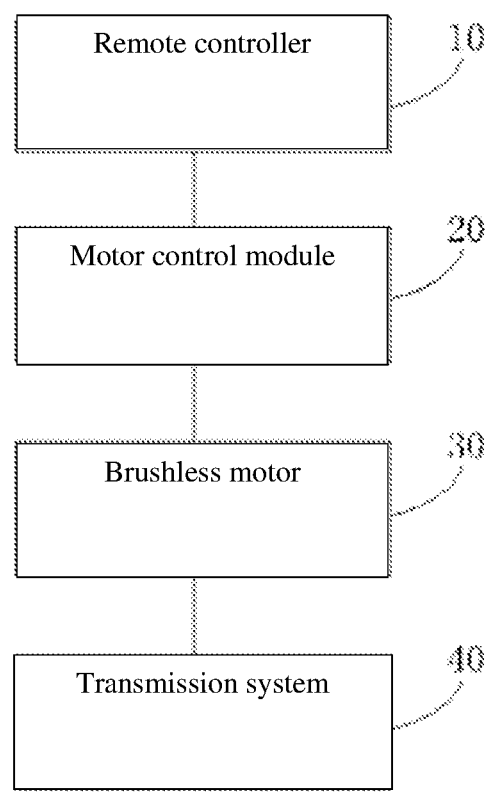
FIG. 6 is a structural diagram of the device for controlling the linear brakes of remote-controlled model racing cars as disclosed in the embodiment 2.

In addition, as shown in FIG. 6, this embodiment proposes a structural diagram of a device for controlling the linear brakes of remote-controlled model racing cars. The device includes a remote-controller (10), a motor control module (20), a brushless motor (30), and a transmission system (40).

The remote-controller (10) may receive the remote-control command selected by the user according to the condition of the model cars, and send the remote-control command to the motor control module of the model cars; the remote-control command includes a braking command; the braking command includes the current throttle value;

The motor control module (20) may control the motor by receiving the remote-control command and selecting appropriate control algorithms; when a braking command is sent by the remote-controller, the appropriate braking algorithm is selected according to the current brushless motor (30) speed; if the current brushless motor (30) speed is greater than the first threshold, the braking current of the brushless motor (30) is controlled by selecting the Foc brake control algorithm according to the received remote-control command; if the current brushless motor (30) speed is less than or equal to the first threshold, the braking current of the brushless motor (30) is controlled by switching to the PWM based braking algorithm according to the received remote-control command;

The transmission system (40) may receive and control the braking torque of the brushless motor (30) on the transmission system (40) according to the braking current.

Furthermore, the motor control module (20) also includes a first brake control module. The first brake control module may select the Foc brake control algorithm according to the received remote-control command and the braking current of the brushless motor is controlled if the speed of the current brushless motor is greater than the first threshold; the first brake control module is also used under following conditions:

The current throttle value in the braking command is converted into the reference braking current Iq and this is input into the current controller; the current controller determines the voltage required to maintain the reference value of the braking current, and outputs the voltages Vd and Vq; based on the rotor angle information provided by the HALL sensor, the Valpha and Vbeta in the stator coordinate system are derived from inverse PARK transformation of the voltages Vd and Vq; Valpha and Vbeta are input to the SVPWM to generate the control signal of the inverter and to control the brushless motor.

Furthermore, the motor control module (20) also includes a second brake control module. The second brake control module is used to control the braking current of the brushless motor (30) when the current brushless motor (30) speed is less than or equal to the first threshold value by switching to the brake algorithm based on PWM control according to the received remote-control command.

The second brake control module is also used under following conditions: Convert the current throttle value in the braking command into the duty cycle signal of the three lower bridges and input it to the inverter; when the brushless motor (30) has a rotating speed, the permanent magnet of the brushless motor (30) will cut the wire and generate a BEMF in the three phase lines. At this time, the three lower bridges will be connected to form a loop, and the BEMF will generate the braking current in the loop to achieve the braking effect.

Moreover, this embodiment also provides a linear brake control system which includes the aforesaid device for controlling the linear brakes of remote-controlled model racing cars, and for implementing steps of the aforesaid method for controlling the linear brakes of remote-controlled model racing cars.

In addition, this embodiment also provides a computer-readable storage medium in which at least one instruction is stored; such instruction is loaded and executed by a processor to realize the steps of the aforesaid method for controlling the linear brakes of remote-controlled model racing cars.

It is apparent to those skilled in the art that the units and algorithm steps of each example described in conjunction with the embodiments disclosed herein can be implemented in electronic hardware, computer software, or in both. In order to clearly explain the interchangeability of hardware and software, the composition and steps of each example have been generally described in the above description according to their functions. Whether these functions are implemented in hardware or software depends on the specific application and design constraints of the technical solution. Professional technicians may use different methods to realize the described functions for each specific application, but such implementation shall not be construed beyond the scope of the disclosure.

In several embodiments provided in the present application, it should be understood that the disclosed device and method can be implemented in other ways. For example, the embodiments of the aforesaid device are only schematic. For example, the units are only divided by logical functions, or by other method during the actual implementation. For example, multiple units or components can be combined or integrated into another system, or some features can be ignored or be skipped. In addition, the mutual coupling or direct coupling or communication connection shown or discussed may be indirect coupling or communication linkage through some interfaces, devices or units, or in the electrical, mechanical connection or in other forms of connection.

The unit described as a separate component may or may not be physically separated. As a unit, those skilled in the art can realize that the unit and algorithm steps described in combination with the embodiments disclosed herein can be implemented in electronic hardware, computer software, or in combination of any two means. In order to clearly explain the interchangeability of hardware and software, in the above description, the composition and steps of each example have been generally described in terms of function. Whether these functions are implemented in hardware or software depends on the specific application and design constraints of the technical solution. Professional technicians may use different methods to realize the described functions for each specific application, but such implementation shall not be construed beyond the scope of the disclosure.

In addition, each functional unit in each embodiment of the disclosure may be integrated in a processing unit, or each physical unit exist independently, or two or more units may be integrated in a unit. The aforesaid integrated units can be realized in the form of hardware or software functional units.

If the integrated unit is implemented in the form of a software functional unit and is sold or used as an independent product, it may be stored in a computer-readable storage medium. Based on this understanding, the portion of the technical solution of the disclosure that contributes to the prior art in essence, or the whole or part of the technical solution may be embodied in the form of a software product. The computer software product is saved in a storage medium. A number of instructions are included to enable a computer device (which may be a personal computer, a server, or a grid device, etc.) to perform all or part of the steps of the method described in various embodiments of the present disclosure. The aforementioned storage media include USB flash disk, mobile hard disk, Read Only Memory (ROM), Random Access Memory (RAM), magnetic disc or optical disc and other media that can store program codes.

The foregoing specific embodiments further describe the purpose, technical solution and beneficial effects of the disclosure. It should be understood that the foregoing is the only specific embodiments of the disclosure and does not intend to limit the scope of protection of the disclosure. Any modification, equivalent substitution, improvement, etc. made within the spirit and principles of the disclosure should be included in the scope of protection of the disclosure.

What is claimed is:

1. A method for controlling the linear brakes of remote-controlled model racing cars comprising:

step (1) a user sends a remote-control command to the motor control module of a model car through a remote controller; the remote-control command includes a braking command; the braking command includes a current throttle value;

step (2) when a braking command is sent by the remote controller, the motor control module selects an appropriate braking algorithm according to a speed of a current brushless motor;

if the speed of the current brushless motor is greater than a first threshold, the brake control algorithm selects a field-oriented control (Foc) according to the received remote-control command and a braking current of the brushless motor is controlled;

if the current speed of the brushless motor is less than the first threshold, the braking algorithm will switch to a pulse width modulation (PWM) control according to the received remote-control command and the braking current of the brushless motor is controlled; and the first threshold is defined as a value greater than 0;

step (3) the brushless motor controls the braking torque of the braking transmission system according to the braking current;

wherein in step (2), if the speed of the current brushless motor is greater than the first threshold, a magnetic Foc brake control algorithm is selected according to the received remote-control command and controls the braking current of the brushless motor, and the magnetic Foc brake control algorithm comprises following steps:

step (201) convert the current throttle value in the braking command into a reference braking current Iq, and input it to a current controller;

step (202) the current controller is configured to determine a voltage required to maintain the reference braking current, and output voltages Vd and Vq;

step (203) based on a rotor angle information provided by a HALL sensor, derive Valpha and Vbeta in a stator coordinate system from an inverse PARK transformation of the voltages Vd and Vq; and step (204) generate a control signal of an inverter and realize control of brushless motors after Valpha and Vbeta are input to a space vector pulse width modulation (SVPWM).

2. The method for controlling the linear brakes of remote-controlled model racing cars according to claim 1, wherein in the step (2), if the speed of the current brushless motor is less than or equal to the first threshold, the braking current of the brushless motor is controlled by switching to a brake algorithm based on the PWM control according to the received remote-control command, including:

step (211) convert the current throttle value in the braking command into the duty cycle signal of three lower bridges and input it to the inverter; and step (212) when the brushless motor has a rotating speed, a permanent magnet of the brushless motor will cut a wire and generate a back electro-motive force (BEMF) in three phase lines, the three lower bridges will be connected to form a loop, and the BEMF will generate the braking current in the loop to achieve a braking effect.

3. The method for controlling the linear brakes of remote-controlled model racing cars according to claim 1, wherein in the step (1), the remote-control command also includes a driving command; the driving command includes a current throttle value; and the step (2) also includes steps of the motor control module controlling an output voltage of the inverter and the driving speed of the brushless motor by adjusting a duty cycle of the PWM module according to the current throttle value when the remote-control command is a driving command.

4. A device for controlling linear brakes of remote-controlled model racing cars comprising a remote controller, a motor control module, a brushless motor, and a transmission system;

the remote controller is configured to receive a remote-control command selected by a user according to a condition of the model cars, and send the remote-control command to the motor control module of the model cars; the remote-control command includes a braking command; a braking command includes a current throttle value;

the motor control module is configured to control the motor by receiving a remote-control command and selecting appropriate control algorithms;

when a braking command is sent by the remote controller, the appropriate braking algorithm is selected according to a speed of a current brushless motor;

if the speed of the current brushless motor is greater than a first threshold the braking current of the brushless motor is controlled by selecting a field-oriented control (Foc) brake control algorithm according to the received remote-control command;

if the speed of the current brushless motor is less than or equal to the first threshold, the braking current of the brushless motor is controlled by switching to a braking algorithm based on a pulse width modulation (PWM) control according to the received remote-control command; and the first threshold is defined as a value greater than 0;

the transmission system is configured to receive and control a braking torque of the brushless motor on the transmission system according to the braking current;

the motor control module also includes a first brake control module, the first brake control module is configured to select a magnetic Foc brake control algorithm according to the received remote-control command and the braking current of the brushless motor is controlled if the speed of the current brushless motor is greater than the first threshold; and the first brake control module is also used under following conditions: a current throttle value is controlled in the braking command into a reference braking current Iq and input it to the current controller;

the current controller determines the voltage required to maintain the reference value of the braking current, and outputs voltages Vd and Vq;

based on a rotor angle information provided by a HALL sensor, a Valpha and Vbeta in a stator coordinate system are derived from inverse PARK transformation of the voltages Vd and Vq; and Valpha and Vbeta are input to a space vector pulse width modulation (SVPWM) to generate a control signal of the inverter and to control the brushless motor.

5. The device for controlling the linear brakes of remote-controlled model racing cars according to claim 4 wherein, the motor control module also includes a second brake control module, the second brake control module is configured to switch to the brake algorithm based on PWM control;

the braking current of the brushless motor is controlled when the speed of the current brushless motor is less than or equal to the first threshold according to the received remote-control command;

the second brake control module is also used under following conditions:

the current throttle value in the braking command is converted into a duty cycle signal of three lower bridges and input it to a inverter; and when the brushless motor has a rotating speed, a permanent magnet of the brushless motor will cut a wire and generate a back electro-motive force (BEMF) in three phase lines at this time; the three lower bridges will be connected to form a loop; and the BEMF will generate the braking current in the loop to achieve a braking effect.

6. A linear brake control system comprising the device for controlling the linear brakes of remote-controlled model racing cars according to claim 4.

7. A non-transitory computer-readable storage medium wherein at least one instruction is saved in the storage medium, and the at least one instruction is loaded and executed by a processor to realize the steps of a method for controlling the linear brakes of remote-controlled model racing cars according to claim 1.

8. The linear brake control system according to claim 6, wherein the motor control module also includes a second brake control module, the second brake control module is configured to switch to the brake algorithm based on PWM control and the braking current of the brushless motor is controlled when the speed of the current brushless motor is less than or equal to the first threshold according to the received remote-control command; and the second brake control module is also used under following conditions:

the current throttle value in the braking command is converted into a duty cycle signal of three lower bridges and input it to a inverter; and when the brushless motor has a rotating speed, a permanent magnet of the brushless motor will cut a wire and generate a BEMF in three phase lines at this time; the three lower bridges will be connected to form a loop; and the BEMF will generate the braking current in the loop to achieve a braking effect.

9. The non-transitory computer-readable storage medium according to claim 7, wherein in the step (2), if the speed of the current brushless motor is less than or equal to the first threshold, the braking current of the brushless motor is controlled by switching to a brake algorithm based on the PWM control according to the received remote-control command, including:

step (211) convert the current throttle value in the braking command into the duty cycle signal of a three lower bridges and input it to the inverter; and step (212) when the brushless motor has a rotating speed, a permanent magnet of the brushless motor will cut a wire and generate a back electro-motive force (BEMF) in three phase lines; the three lower bridges will be connected to form a loop; and the BEMF will generate the braking current in the loop to achieve a braking effect.

10. The non-transitory computer-readable storage medium according to claim 7, wherein in the step (1), the remote-control command also includes a driving command; the driving command includes a current throttle value; and the step (2) also includes steps of the motor control module controlling the output voltage of a inverter and the driving speed of the brushless motor by adjusting a duty cycle of the PWM module according to the current throttle value when the remote-control command is a driving command.

\* \* \* \* \*